Patented Dec. 11, 1945

2,390,530

UNITED STATES PATENT OFFICE 2,390,530

SYNTHETIC GUM FOR PAINTS AND VARNISHES

Howard L. Gerhart, Milwaukee, Wis., and Leon M. Adams, Corpus Christi, Tex., assignors to Pittsburgh Plate Glass Company, a corporation of Pennsylvania No Drawing. Application December 3, 1943, Serial No. 512,771

3 Claims. (Cl. 260—23)

The present invention relates to the preparation of a solid resin suitable for use as a "gum" in paints and varnishes, and it has particular relation to the preparation of such resin as a copolymer from cyclopentadiene, or a polymer thereof, and a glyceride oil.

One object of the invention is to provide an inexpensive solid resin which is compatible with drying oils, to provide a "gum" constituent for the latter.

A second object is to provide a gum constituent for drying oils that substantially speeds up the drying of the oil.

These and other objects will be apparent from consideration of the following specification and the appended claims.

In the paint and varnish industry, it is customary to incorporate a soluble plastic body with the drying oil in order to increase the viscosity or hardness of the film during the interim between the application of the film and the final setting of the oil to a hard insoluble state. A plastic so employed is termed a "gum," though in many, if not most, instances it is not technically a gum. Many plastic bodies have been employed as "gums." These include ester gum, rosin, Manila gum, alkyd resins, phenol-formaldehyde resins and many others.

In most if not all instances these "gum" compounds have been soluble in but inert with respect to the oil into which they were incorporated. They did not increase the rate of drying of the oil. Therefore, the latter would retain an objectionable "tack" or stickiness for considerable periods of time.

The present invention is based upon the discovery that solid resin or plastics obtained by conjointly polymerizing cyclopentadiene or a lower polymer containing 2 to 5 cyclic $C_5H_6$ groups, a minimal amount of an unsaturated glyceride oil, can be successfully employed as a "gum" in paint and varnish oils. Such "gums" are comparatively inexpensive to produce, are readily compatible with a drying oil and have the further advantage that they seem to speed up the drying of the film of a paint or varnish to a hard, tack-free state.

The "gum" resins contemplated in this application are those copolymers of cyclopentadiene or its lower polymeric derivatives and unsaturated oil, which contain a high portion of the diene hydrocarbon. Usually the diene component will constitute 60 to 90 percent of the reaction mixture, though of course reasonable variations from these limits may be admissible.

The oils to be polymerized with the cyclopentadiene or cyclopentadiene polymer include linseed oil, soya bean oil, perilla oil, oiticica oil, tung oil, cotton oil, palm oil, sunflower oil and others.

Cyclopentadiene and the lower polymers thereof are comparatively miscible with unsaturated glyceride oils. Solutions in the desired proportions can be polymerized at atmospheric temperatures by adding a catalyst, such as boron fluoride and then subjecting the mixture to gradually increasing temperature until a solid polymer results.

Another and perhaps preferred method involves subjecting the oil-hydrocarbon mixture to a temperature of perhaps 180 to 260° C. in an autoclave or other pressure container and at corresponding reaction pressures for perhaps 2 to 4 hours. The reactants are removed and may be cooked into paint and varnish formulations in the usual procedure employed with other gums.

Suitable methods of preparing the copolymers herein contemplated are discussed in greater detail in a copending application Serial No. 324,392, to Howard L. Gerhart, filed March 16, 1940, and entitled "Resinous material."

The following examples illustrate the use of the gums herein disclosed in the preparation of a varnish:

Example I

A copolymer was prepared from 14 parts dicyclopentadiene and 7 parts bodied linseed oil by the method already described. It was conveniently poured into trays and allowed to harden. The somewhat brittle mass was heated with bodied linseed oil in the ratio of 224 parts copolymer and 128 parts oil. After 100 minutes at 530 to 560° F. the body was P (Gardner-Holdt scale) in 50% concentration in petroleum naphtha.

Example II

Two (2) parts crude light oil containing 85% dicyclopentadiene by analysis was heated with 1 part of bodied linseed oil in an autoclave until only 3.4% of volatile matter remained in the heavy syrup. (The volatile content was determined by heating a thin film of the copolymer for 2 hours at 100° C.). 253 parts of this copolymer was heated in an open kettle with 162 parts of bodied linseed oil for 150 minutes at 540 to 550° C. The loss in weight was 7.2%. The body at 50% in petroleum thinners was I.

This example demonstrates that at least certain of the impurities in crude dicyclopentadiene can be made to react to form a copolymer with glycerides. The varnishes produced from such copolymers have superior water resistance and dry very rapidly with the assistance of the usual driers. Enamels made from them are also especially useful where quick drying and good resistance is desired.

The linseed oil of the above varnishes can be replaced by soya bean oil, tung oil, oiticica oil and others. The ratio of "gum" in the varnish should fall within such range that the clear unpigmented varnish, exclusive of possible solvents will contain from 40 to 70% of oil.

Colors and pigments, such as titanium dioxide, basic lead carbonate, chrome yellow and others can be incorporated in the usual amounts into the varnishes, by conventional methods of grinding.

Lead and cobalt driers can also be added, if so desired, in conventional manner.

The new "gums" can be admixed in appropriate amounts (e. g. equal proportions) with conventional "gums" in a varnish composition. "Gums" that can be so added include rosin, ester gum, phenolic varnish gums.

As previously stated, oils and varnishes containing the copolymers of cyclopentadiene or its lower polymers and a glyceride oil, as a "gum," set to solid tack-free state more rapidly than those containing only rosin, ester gum and similar "gums." For example, an oil varnish containing ester gum as "gum," when spread as a film, was found to be still tacky after 18 hours. On the other hand, similar compositions in which the new copolymers were employed as gum had set to a hard, tack-free state at the end of that time.

The forms of the invention herein disclosed are to be considered merely as being exemplary. Numerous modifications may be made therein without departure from the spirit of the invention or the scope of the appended claims.

What we claim is:

1. A varnish composition comprising a mixture of 40 to 70 percent of drying oil and sufficient resin dissolved therein to constitute 100 percent upon the basis of the mixture of the oil and the resin components, said resin constituting a copolymer of a mixture of 10 to 40 percent of drying oil and 90 to 60 percent of a diene hydrocarbon consisting of 1 to 5 cyclic $C_5H_6$ groups per molecule.

2. A varnish composition as defined in claim 1 in which the drying oil in the varnish mixture and in the resin is linseed oil.

3. A varnish composition as defined in claim 1 in which the drying oil of the varnish mixture and the resin is linseed oil and the diene hydrocarbon is dicyclopentadiene.

HOWARD L. GERHART.
LEON M. ADAMS.